United States Patent
Ahn et al.

(10) Patent No.: US 10,487,204 B2
(45) Date of Patent: Nov. 26, 2019

(54) METHOD OF PREPARING ASA GRAFT COPOLYMER, METHOD OF PREPARING THERMOPLASTIC ASA RESIN COMPOSITION INCLUDING THE SAME, AND METHOD OF PREPARING ASA MOLDED PART

(71) Applicant: LG CHEM, LTD., Seoul (KR)

(72) Inventors: Bong Keun Ahn, Daejeon (KR); Yong Yeon Hwang, Daejeon (KR); Hyun Taek Oh, Daejeon (KR); Min Jung Kim, Daejeon (KR); Chun Ho Park, Daejeon (KR); Eun Soo Kang, Daejeon (KR); Yong Hee An, Daejeon (KR); Jang Won Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 57 days.

(21) Appl. No.: 15/781,073

(22) PCT Filed: Oct. 25, 2017

(86) PCT No.: PCT/KR2017/011860
§ 371 (c)(1),
(2) Date: Jun. 1, 2018

(87) PCT Pub. No.: WO2018/084486
PCT Pub. Date: May 11, 2018

(65) Prior Publication Data
US 2018/0355161 A1    Dec. 13, 2018

(30) Foreign Application Priority Data

Nov. 2, 2016  (KR) .......................... 10-2016-0144880

(51) Int. Cl.
*C08L 25/12*  (2006.01)
*C08F 285/00*  (2006.01)
*C08F 2/24*  (2006.01)
*C08F 220/70*  (2006.01)
*B29C 45/00*  (2006.01)
*C08F 212/08*  (2006.01)

(52) U.S. Cl.
CPC ................ *C08L 25/12* (2013.01); *C08F 2/24* (2013.01); *C08F 285/00* (2013.01); *B29C 45/0001* (2013.01); *C08F 212/08* (2013.01); *C08F 220/70* (2013.01); *C08F 2800/20* (2013.01); *C08F 2810/20* (2013.01); *C08L 2312/00* (2013.01)

(58) Field of Classification Search
CPC ...... C08L 25/12; C08L 51/003; C08F 285/00; C08F 212/08
See application file for complete search history.

(56) References Cited

U.S. PATENT DOCUMENTS 5,821,302 A * 10/1998 Rosenau ............... C08F 285/00
525/80

FOREIGN PATENT DOCUMENTS

| EP | 3363819 A1 | 8/2018 |
| KR | 19960034249 A | 10/1996 |
| KR | 100379797 B1 | 8/2003 |
| KR | 100815995 B1 | 3/2008 |
| KR | 1020090038507 A | 4/2009 |
| KR | 1020150067736 A | 6/2015 |
| KR | 1020160077627 A | 7/2016 |

OTHER PUBLICATIONS

European Search Report for Application No. 17867846.2 dated Jan. 7, 2019.
International Search Report for PCT/KR2017/011860 dated Feb. 1, 2018.

* cited by examiner

Primary Examiner — Jeffrey C Mullis

(57) ABSTRACT

The present invention relates to a method of preparing an ASA graft copolymer, a method of preparing a thermoplastic ASA resin composition including the same, and a method of preparing an ASA molded part, and more particularly, to a method of preparing a multilayered ASA graft copolymer including a step of preparing seeds, cores, and shells. According to the method, since a multifunctional carboxylic acid having 20 or more carbon atoms or a salt thereof is introduced as an emulsifier, the content of the emulsifier remaining in a resin may be reduced, thereby providing an ASA resin having excellent thermal stability and appearance characteristics while the inherent physical properties thereof, such as impact resistance and weather resistance, are maintained.

16 Claims, No Drawings

METHOD OF PREPARING ASA GRAFT COPOLYMER, METHOD OF PREPARING THERMOPLASTIC ASA RESIN COMPOSITION INCLUDING THE SAME, AND METHOD OF PREPARING ASA MOLDED PART

CROSS-REFERENCE TO RELATED APPLICATION

This application is a U.S. National Stage of PCT/KR2017/011860 filed Oct. 25, 2017, which claims priority to Korean Patent Application No. 10-2016-0144880, filed on Nov. 2, 2016 in the Korean Intellectual Property Office, the disclosures of which are incorporated herein by reference.

TECHNICAL FIELD

The present invention relates to a method of preparing an ASA graft copolymer, a method of preparing a thermoplastic ASA resin composition including the same, and a method of preparing an ASA molded part, and more particularly, to a method of preparing an ASA graft copolymer, a method of preparing a thermoplastic ASA resin composition including the same, and a method of preparing an ASA molded part, wherein, in the process of preparing a multilayered ASA graft copolymer including a step of preparing seeds, cores, and shells, a multifunctional carboxylic acid having 20 to 60 carbon atoms or a salt thereof is introduced as an emulsifier to secure the stability of a polymerization reaction and a latex, whereby a final product having excellent thermal stability, weather resistance, colorability, mechanical strength, and appearance may be prepared.

BACKGROUND ART

In general, ABS resins, which are obtained by graft copolymerizing an aromatic vinyl monomer and a vinyl cyan monomer to a diene rubber polymer prepared by polymerizing conjugated diene monomers, have excellent impact resistance and processability, and are excellent in mechanical strength, heat deflection temperature, and colorability. Thus, ABS resins have been widely used in electric and electronic products, automobile parts, and office equipment. However, since rubber polymers used in preparation of ABS resins contain chemically unstable unsaturated bonds, there is a problem that rubber polymers are easily aged by ultraviolet light and thus the weather resistance of ABS resins is very weak.

To overcome such disadvantages, there has been proposed a method of adding a stabilizer capable of improving weather resistance when a resin composition is prepared by extruding an ABS resin, but the effect thereof was insufficient and the problem of being vulnerable to ultraviolet light was still not solved. Thus, a method, in which a polymer obtained by mixing and polymerizing a diene monomer and an acrylic monomer is used or a chemically more stable acrylic rubber polymer is used instead of a diene rubber polymer containing double bonds, has been proposed.

A representative example of a weather-resistant thermoplastic resin using an acrylic rubber polymer containing no unstable double bond is acrylate-styrene-acrylonitrile (ASA). Since ASA does not contain unstable double bonds in the polymer, it has excellent weather resistance, chemical resistance, and thermal stability, and thus ASA has been widely used in fields requiring such properties, for example, outdoor electric and electronic parts, building materials, farm equipment, ASA/ABS double layer sheets, profile extrusion, road signs, outdoor products, PVC for construction materials, leisure goods, sporting goods, and automobile parts.

In addition, as an emulsifier in preparation of the ASA copolymer and similar ASA resins, low molecular weight carboxylates, including potassium rosinate, sodium rosinate, sodium laurate, sodium oleate, potassium oleate, and potassium stearate, or sulfur-containing emulsifiers, including alkyl sulfosuccinic acid metal salt derivatives having 12 to 18 carbon atoms, alkyl sulfuric esters having 12 to 20 carbon atoms, and sulfonic acid metal salts, have been used.

However, in the case of such a low molecular weight emulsifier, the amount of the emulsifier to be added is relatively increased to sufficiently secure the stability of a latex. As a result, the emulsifier remains in the latex and a resin after polymerization, and thus gas is significantly generated on the surface of the resin during a high-temperature thermoforming process. This may reduce the thermal stability and surface properties of the resin. Recently, ASA resins have been applied to thin film products such as sidings, sheets, and co-extrusion films. Accordingly, there is growing demand for a technique of reducing the amount of gas generated in a molding process by reducing residues in a resin to improve thermal stability and appearance characteristics.

Prior Art Document

[Patent Document] (Patent Document 1) KR 10-0815995 B1

DISCLOSURE

Technical Problem

Therefore, the present invention has been made in view of the above problems, and it is one object of the present invention to provide a method of preparing an ASA graft copolymer. According to the method, the amount of unnecessary residues remaining in a latex is reduced, so that thermal stability during a molding process is secured and gas generation is reduced, thereby improving the appearance characteristics of a resin while maintaining the inherent physical properties of an ASA resin such as weather resistance, chemical resistance, and mechanical strength.

It is another object of the present invention to provide a method of preparing a thermoplastic ASA resin composition, and a method of preparing an ASA molded part, wherein the thermoplastic ASA resin composition includes the ASA graft copolymer prepared by the method of preparing an ASA graft copolymer and satisfies weather resistance, chemical resistance, mechanical strength, surface gloss, thermal stability, and appearance characteristics.

The above and other objects of the present invention can be achieved by the present invention described below.

Technical Solution

In accordance with one aspect of the present invention, provided is a method of preparing an ASA graft copolymer including a seed preparation step, in which one or more monomers selected from an aromatic vinyl monomer, a vinyl cyan monomer, and an alkyl acrylate monomer are polymerized to prepare seeds; a core preparation step, in which an alkyl acrylate monomer is added in the presence of the prepared seeds, and polymerization is performed to prepare cores; and a shell preparation step, in which one or more monomers selected from an aromatic vinyl monomer and a vinyl cyan monomer and an emulsifier are added in the presence of the prepared cores, and graft polymerization is performed to prepare shells, wherein the emulsifier contains a multifunctional carboxylic acid having 20 to 60 carbon atoms or a salt thereof, and the average size of the prepared shells is 80 to 150 nm (larger than the average size of the cores).

In accordance with another aspect of the present invention, provided is a method of preparing a thermoplastic ASA resin composition, including a step of mixing and extruding 20 to 60% by weight of the ASA graft copolymer according to the method and 40 to 80% by weight of a vinyl cyan monomer-aromatic vinyl monomer copolymer.

In accordance with yet another aspect of the present invention, provided is a method of preparing an ASA molded part, including a step of injecting the thermoplastic ASA resin composition.

Advantageous Effects

As apparent from the foregoing, the present invention advantageously provides a method of preparing an ASA graft copolymer including a step of preparing seeds, cores, and shells. According to the method, since a multifunctional carboxylic acid having 20 or more carbon atoms or a salt thereof is introduced as an emulsifier, the content of the emulsifier remaining in an ASA graft copolymer latex and an ASA graft copolymer resin can be reduced, thereby providing an ASA resin having excellent thermal stability and appearance characteristics while maintaining the inherent physical properties thereof.

Specifically, the ASA molded part prepared, as a final product, by injecting a resin composition containing the ASA graft copolymer according to the present invention has excellent thermal stability, and the surface thereof has excellent appearance characteristics. That is, the number of projections on the surface of the ASA molded part is small, and surface gloss is high.

BEST MODE

The present inventors confirmed that, in preparation of an ASA graft copolymer, when a multifunctional carboxylic acid having 20 or more carbon atoms or a salt thereof was added as an emulsifier, the amount of the emulsifier remaining in a latex was reduced, so that the thermal stability of a resin during a molding process was improved, and the amount of generated gas was reduced, thereby improving the appearance characteristics of the resin. Based on this finding, the present invention was completed.

In the present disclosure, the multifunctional carboxylic acid includes a derivative or an anhydride thereof.

In the present disclosure, a derivative refers to a compound in which one or two or more of the hydrogen atoms of an original compound are substituted with an alkyl group, a halogen group, or a hydroxyl group.

Hereinafter, a method of preparing the ASA graft copolymer of the present invention will be described in detail.

The method of preparing an ASA graft copolymer according to the present invention includes a) a seed preparation step, in which one or more monomers selected from an aromatic vinyl monomer, a vinyl cyan monomer, and an alkyl acrylate monomer are polymerized to prepare seeds; b) a core preparation step, in which an alkyl acrylate monomer is added in the presence of the prepared seeds, and polymerization is performed to prepare cores; and c) a shell preparation step, in which one or more monomers selected from an aromatic vinyl monomer and a vinyl cyan monomer and an emulsifier are added in the presence of the prepared cores, and graft polymerization is performed to prepare shells, wherein the emulsifier contains a multifunctional carboxylic acid having 20 to 60 carbon atoms or a salt thereof, and the average size of the prepared shells is 80 to 150 nm (larger than the average size of the cores).

For example, the emulsifier may include a multifunctional carboxylic acid having 20 to 60 carbon atoms, 20 to 55 carbon atoms, or 30 to 55 carbon atoms or a salt thereof. When the emulsifier is introduced, the thermal stability of a resin is improved, and the amount of gas generated during a high-temperature molding process is reduced, thereby improving appearance.

As another example, the emulsifier may include a multifunctional carboxylic acid or a salt thereof, wherein the multifunctional carboxylic acid has 20 to 60 carbon atoms, and two or more, preferably two or three carboxyl groups are included in the structure of the multifunctional carboxylic acid. When the emulsifier is introduced, the thermal stability of a resin is improved, and the amount of gas generated during a high-temperature molding process is reduced, thereby improving appearance.

The salt may be a metal salt, for example, an alkali metal salt of sodium, potassium, or the like, as another example, an alkaline earth metal salt of magnesium, calcium, or the like, without being limited thereto.

As a more specific example, a multifunctional carboxylic acid having 20 to 60 carbon atoms may be one or more of compounds represented by Formulas 1 to 7 below, without being limited thereto.

[Formula 1]
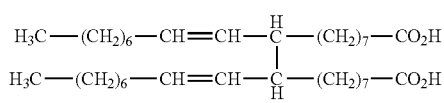

[Formula 2]
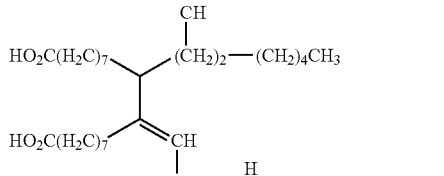

[Formula 3]
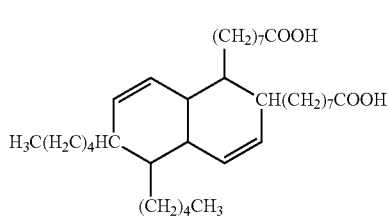

[Formula 4]
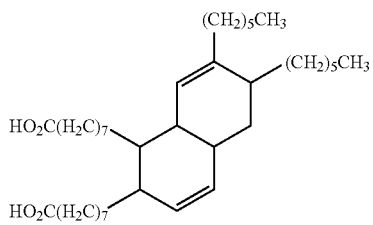

[Formula 5]

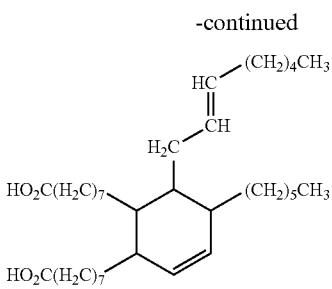

[Formula 6]

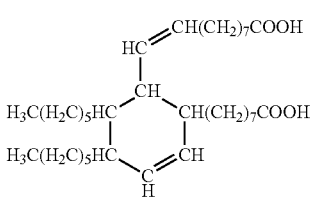

[Formula 7]

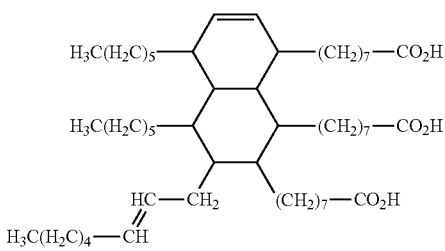

The emulsifier may include a multifunctional carboxylic acid having 20 to 60 carbon atoms or a salt thereof alone, or may be used in combination with an emulsifier for preparing a conventional ASA graft copolymer.

In the present invention, when a multifunctional carboxylic acid having 20 to 60 carbon atoms or a salt thereof is used in combination with a conventional emulsifier, the multifunctional carboxylic acid having 20 to 60 carbon atoms or the salt thereof may be contained in an amount of 30 to 100% by weight, preferably 40 to 100% by weight, 50 to 100% by weight, 60 to 100% by weight, or 70 to 100% by weight, with respect to the total weight of the emulsifier.

As the conventional emulsifier, known emulsifiers used to prepare ASA graft copolymers and similar resins may be used.

For example, the conventional emulsifier may be a low molecular weight carboxylate having 20 or less carbon atoms or 10 to 20 carbon atoms including rosin acid salts, lauric acid salts, oleic acid salts, stearic acid salts, and the like.

As another example, the conventional emulsifier may be an alkyl sulfosuccinic acid salt having 20 or less carbon atoms or 10 to 20 carbon atoms or a salt thereof. As another example, the conventional emulsifier may be an alkyl sulfate or a sulfonate having 20 or less carbon atoms or 10 to 20 carbon atoms.

Preferably, a multifunctional carboxylic acid having 20 to 60 carbon atoms or a salt thereof and a low molecular weight carboxylate having 20 or less carbon atoms or 10 to 20 carbon atoms may be mixed and used as the emulsifier of the present invention. Since the low molecular weight carboxylate is used, an ASA resin having excellent weather resistance, impact resistance, and surface properties may be prepared.

For example, the emulsifier may contain a multifunctional carboxylic acid having 20 to 60 carbon atoms or a salt thereof and a carboxylate having 20 or less carbon atoms or 10 to 20 carbon atoms in a weight ratio of 1:0.1 to 1:10, preferably 1:0.1 to 1:5, more preferably 1:0.1 to 1:2. Within the above range, weather resistance, impact resistance, appearance characteristics, and physical property balance may be excellent.

Hereinafter, a method of preparing the ASA graft copolymer of the present invention, in which the novel emulsifier is used, will be described in detail for each step.

a) Seed Preparation Step:

For example, with respect to 100 parts by weight of total monomers used to prepare the graft copolymer, 4 to 20 parts by weight, 4 to 15 parts by weight, or 4 to 10 parts by weight of one or more monomers selected from an aromatic vinyl monomer, a vinyl cyan monomer, and an alkyl acrylate monomer may be polymerized to prepare seeds. When the monomer is used in an amount within the above range, an ASA graft copolymer having excellent impact resistance, weather resistance, physical property balance, and the like may be prepared.

In the seed preparation step, an alkyl acrylate monomer may be used alone or in combination with an aromatic vinyl monomer or a vinyl cyan monomer to improve the weather resistance and mechanical strength of the ASA resin.

As a specific example, in the seed preparation step, 4 to 20 parts by weight of one or more monomers selected from an aromatic vinyl monomer, a vinyl cyanmonomer, and an alkyl acrylate monomer, 0.01 to 1 part by weight of a crosslinking agent, 0.01 to 3 parts by weight of an initiator, and 0.01 to 5 parts by weight of an emulsifier may be polymerized to prepare seeds. Within this range, a polymer having a uniform size may be prepared within a short time, and physical properties such as weather resistance and impact resistance may be further improved.

As another specific example, in the seed preparation step, 4 to 15 parts by weight of one or more monomers selected from an aromatic vinyl monomer, a vinyl cyan monomer, and an alkyl acrylate monomer, 0.01 to 0.5 parts by weight of a crosslinking agent, 0.01 to 1 part by weight of an initiator, and 0.01 to 2 parts by weight of an emulsifier may be polymerized to prepare seeds. Within this range, a polymer having a uniform size may be prepared within a short time, and physical properties such as weather resistance and impact resistance may be further improved.

When the seed preparation step is performed, one or more of an electrolyte and a grafting agent may be further included.

For example, the electrolyte may be used in an amount of 0.0001 to 1 part by weight, 0.001 to 1 part by weight, or 0.05 to 1 part by weight. Within this range, the stability of polymerization and a latex may be improved.

For example, the grafting agent may be used in an amount of 0.01 to 3 parts by weight, 0.01 to 1 part by weight, or 0.01 to 0.1 parts by weight. Within this range, the graft ratio of an ASA graft polymer may be increased, and physical properties may be improved.

An average size of seeds obtained in the seed preparation step is 30 to 80 nm, preferably 35 to 70 nm, more preferably 40 to 70 nm. Within the above range, the appearance characteristics and impact resistance of the ASA molded part may be excellent.

b) Core Preparation Step:

For example, 30 to 60 parts by weight, 40 to 60 parts by weight, or 40 to 50 parts by weight of an alkyl acrylate monomer and 0.01 to 1 part by weight, 0.05 to 1 part by weight, or 0.1 to 0.5 parts by weight of a crosslinking agent may be added in the presence of the seeds, and polymerization may be performed to prepare cores. Within the above-mentioned range, the physical properties of a resin, such as impact resistance and weather resistance, may be improved.

As a specific example, in the core preparation step, 30 to 60 parts by weight of an alkyl acrylate monomer, 0.01 to 1 part by weight of a crosslinking agent, 0.01 to 3 parts by weight of an initiator, and 0.01 to 5 parts by weight of an emulsifier may be added in the presence of the seeds, and polymerization may be performed to prepare cores. Within the above range, impact resistance and physical property balance may be excellent.

As another specific example, in the core preparation step, 30 to 60 parts by weight of an alkyl acrylate monomer, 0.05 to 1 part by weight of a crosslinking agent, 0.01 to 1 part by weight of an initiator, and 0.01 to 2 parts by weight of an emulsifier may be added in the presence of the seeds, and polymerization may be performed to prepare cores. Within the above range, the mechanical strength and appearance characteristics of an ASA resin may be excellent.

An average size of cores obtained in the core preparation step is 70 to 110 nm, preferably 70 to 100 nm, more preferably 75 to 95 nm. Within the above range, the stability of a latex may be excellent, and the mechanical strength and surface properties of a polymer may be excellent (in the present disclosure, the average size of cores is larger than the average size of seeds).

c) Shell Preparation Step

For example, 30 to 60 parts by weight, 40 to 60 parts by weight, or 45 to 55 parts by weight of an aromatic vinyl monomer or a vinyl cyan monomer and 0.1 to 3 parts by weight, 0.5 to 1.5 parts by weight, or 0.1 to 1 part by weight of an emulsifier may be added in the presence of the cores, and graft polymerization may be performed to prepare shells. In this case, the emulsifier may include a multifunctional carboxylic acid having 20 or more carbon atoms or a salt thereof.

For example, in the shell preparation step, 20 to 40 parts by weight or 25 to 40 parts by weight of an aromatic vinyl monomer and 5 to 20 parts by weight or 10 to 20 parts by weight of a vinyl cyan monomer are preferably added. Within this range, the mechanical strength and appearance of an ASA resin may be improved.

As a specific example, in the shell preparation step, 30 to 60 parts by weight of an aromatic vinyl monomer or a vinyl cyan monomer, 0.1 to 2 parts by weight of an emulsifier, 0.01 to 3 parts by weight of a crosslinking agent, and 0.01 to 3 parts by weight of an initiator may be added in the presence of the cores, and graft polymerization may be performed to prepare shells. Within the above range, a polymer having a desired size may be prepared, and the physical properties of an ASA resin may be improved.

As another specific example, in the shell preparation step, 30 to 60 parts by weight of an aromatic vinyl monomer or a vinyl cyan monomer, 0.1 to 1 part by weight of an emulsifier, 0.01 to 1 part by weight of a crosslinking agent, and 0.01 to 1 part by weight of an initiator may be added in the presence of the cores, and graft polymerization may be performed to prepare shells. Within the above range, the physical properties and physical property balance of an ASA resin may be excellent.

When the shell preparation step is performed, a molecular weight regulator may be further included, and the molecular weight regulator may be used in an amount of 0.01 to 2 parts by weight, 0.05 to 2 parts by weight, or 0.05 to 1 part by weight. Within this range, a polymer having a desired size may be easily prepared.

For example, mercaptans such as tert-dodecyl mercaptan may be used as the molecular weight regulator, without being limited thereto.

An average size of shells (ASA graft copolymer particles) obtained in the shell preparation step is 80 to 150 nm, preferably 85 to 140 nm, more preferably 90 to 135 nm. Within the above range, the stability of a latex may be excellent, and an ASA resin having desired physical properties may be prepared (in the present disclosure, the average size of shells is larger than the average size of cores).

In the present invention, the aromatic vinyl monomer may be, for example, one or more selected from styrene, α-methylstyrene, p-methylstyrene, and vinyl toluene and is preferably styrene, without being limited thereto.

In the present invention, the vinyl cyan monomer may be one or more selected from acrylonitrile, methacrylonitrile, and ethacrylonitrile and is preferably acrylonitrile, without being limited thereto.

In the present invention, the alkyl acrylate may be, for example, an acrylate including a chain or branched alkyl group having 1 to 10 carbon atoms. As a specific example, one or more selected from methyl acrylate, ethyl acrylate, propyl acrylate, butyl acrylate, hexyl acrylate, octylacrylate, and 2-ethylhexyl acrylate may be used as the alkyl acrylate, and an acrylate including a chain alkyl group having 1 to 4 carbon atoms is preferably used as the alkyl acrylate, without being limited thereto.

In the present invention, the crosslinking agent may include an unsaturated vinyl group, and an acrylic compound capable of acting as a crosslinking agent may be used as the crosslinking agent. For example, one or more selected from the group consisting of polyethylene glycol diacrylate, polyethylene glycol dimethacrylate, polypropylene glycol diacrylate, polypropylene glycol dimethacrylate, ethylene glycol diacrylate, ethylene glycol dimethacrylate, divinylbenzene, diethylene glycol dimethacrylate, triethylene glycol dimethacrylate, 1,3-butanediol dimethacrylate, hexanediol propoxylate diacrylate, neopentyl glycol dimethacrylate, neopentyl glycol ethoxylate diacrylate, neopentyl glycol propoxylate diacrylate, trimethylolpropane trimethacrylate, trimethylolmethane triacrylate, trimethylpropane ethoxylate triacrylate, trimethylpropane propoxylate triacrylate, pentaerythritol ethoxylatetriacrylate, pentaerythritolpropoxylatetriacrylate, and vinyltrimethoxysilane may be used as the crosslinking agent, without being limited thereto.

In the present invention, a compound including an unsaturated vinyl group having two or more different reactivity may be used as the grafting agent. For example, the grafting agent may be one or more selected from allyl methacrylate, triallyl isocyanurate, triallyl amine, and diallyl amine, without being limited thereto.

In the present invention, the initiator may be a water-soluble initiator, a fat-soluble initiator, or a mixture of these initiators.

For example, the water-soluble initiator may be sodium persulfurate, potassium persulfurate, ammonium persulfurate, potassium perphosphate, hydrogen peroxide, and the like, without being limited thereto.

For example, the fat-soluble initiator may be one selected from the group consisting of t-butyl peroxide, cumene hydroperoxide, p-methane hydroperoxide, di-t-butyl peroxide, t-butylcumyl peroxide, acetyl peroxide, isobutyl peroxide, octanoyl peroxide, dibenzoyl peroxide, diisopropylbenzene hydroperoxide, 3,5,5-trimethylhexanol peroxide, t-butyl peroxy isobutylate, azobisisobutyronitrile, azobis-2, 4-dimethylvaleronitrile, azobiscyclohexanecarbonitrile, and azobisisobutyric acid (butyl acid) methyl, without being limited thereto.

For example, the water-soluble initiator is preferably used in the seed preparation step or the core preparation step. When the water-soluble initiator is used in the steps, a reaction rate may be controlled to easily prepare a polymer having a desired size, thereby improving the physical properties of the final product ASA resin.

As another example, the fat-soluble initiator is preferably used in the shell preparation step. When the fat-soluble initiator is used in the step, a high degree of polymerization may be achieved, whereby the productivity of a resin may be improved.

In the present invention, the electrolyte may be, for example, one or more selected from the group consisting of KCl, NaCl, $KHCO_3$, $NaHCO_3$, $K_2CO_3$, $Na_2CO_3$, $KHSO_3$, $NaHSO_3$, $K_4P_2O_7$, $Na_4P_2O_7$, $K_3PO_4$, $Na_3PO_4$, $K_2HPO_4$, $Na_2HPO_4$, KOH, NaOH, and $Na_2S_2O_7$, without being limited thereto.

According to the present invention, in the seed preparation step, the core preparation step, or the shell preparation step, an oxidation-reduction catalyst may be further included to further promote an initiation reaction with the initiator. For example, the oxidation-reduction catalyst may be one or more selected from the group consisting of sodium pyrophosphate, dextrose, ferrous sulfide, sodium sulfite, sodium formaldehyde sulfoxylate, and sodium ethylenediamine tetraacetate, without being limited thereto.

In the ASA graft copolymer latex obtained through the seed, core, and shell preparation steps, the content of coagulated material is 1% or less, preferably 0.5% or less, more preferably 0.1% or less. Within the above-mentioned range, the productivity of the resin may be excellent, and the mechanical strength and appearance characteristics of the resin may be improved.

The ASA graft copolymer latex obtained through the seed, core, and shell preparation steps may be prepared in a powder form through conventional processes such as coagulation, washing, and drying. For example, the ASA graft copolymer latex may be coagulated at a temperature of 60 to 100° C. after addition of a metal salt or an acid, and may be prepared in a powder form through aging, dehydration, washing, and drying processes, without being limited thereto.

In the above-described method of preparing an ASA graft copolymer, other conditions (polymerization conversion rate, reaction pressure, reaction time, gel content, etc.) not specified are not particularly limited so long as the conditions are within the range usually used in the technical field of the present invention, and the conditions may be appropriately selected and used as needed.

The ASA graft copolymer according to the preparation method may be mixed with a matrix resin and extruded to prepare a thermoplastic ASA resin composition. Hereinafter, the method of the thermoplastic ASA resin composition of the present invention will be described.

For example, the thermoplastic ASA resin composition of the present invention may be prepared by a method including a step of mixing and extruding 20 to 60% by weight of the ASA graft copolymer and 40 to 80% by weight of a vinyl cyan monomer-aromatic vinyl monomer copolymer. Within the above range, mechanical properties, appearance, and processability may be excellent.

As another example, the thermoplastic ASA resin composition of the present invention may be prepared by a method including a step of mixing and extruding 30 to 60% by weight of the ASA graft copolymer and 40 to 70% by weight of a vinyl cyan monomer-aromatic vinyl monomer copolymer. Within the above range, mechanical strength, appearance and processability may be excellent.

As another example, the thermoplastic ASA resin composition of the present invention may be prepared by a method including a step of mixing and extruding 40 to 50% by weight of the ASA graft copolymer and 50 to 60% by weight of a vinyl cyan monomer-aromatic vinyl monomer copolymer. Within the above range, mechanical strength, appearance and processability may be excellent.

For example, the extrusion may be performed at 200 to 300° C. and 30 to 100 rpm or at 200 to 280° C. and 30 to 70 rpm. Within this range, processability may be excellent, and an ASA resin composition having the desired physical properties may be prepared.

For example, the vinyl cyan monomer-aromatic vinyl monomer copolymer may be a copolymer composed of a vinyl aromatic monomer, such as styrene and a-methylstyrene, and a vinyl cyan monomer, such as acrylonitrile, methacrylonitrile and ethacrylonitrile, without being limited thereto.

For example, the vinyl cyan monomer-aromatic vinyl monomer copolymer may include 15 to 40% by weight of a vinyl cyan monomer and 60 to 85% by weight of an aromatic vinyl monomer with respect to the total weight of the copolymer. Within this range, the mechanical strength, weather resistance, and appearance of an ASA resin may be excellent.

As another example, the vinyl cyan monomer-aromatic vinyl monomer copolymer may include 20 to 35% by weight of a vinyl cyan monomer and 65 to 80% by weight of an aromatic vinyl monomer with respect to the total weight of the copolymer. Within this range, the mechanical strength, weather resistance, and appearance of an ASA resin may be excellent.

According to the method of a thermoplastic ASA resin composition, when the mixing is performed, one or more additives selected from the group consisting of a flame retardant, a lubricant, an antibacterial agent, a release agent, a nucleating agent, a plasticizer, a heat stabilizer, an antioxidant, a light stabilizer, a pigment, a dye, and a compatibilizer may be further mixed. The additive is preferably contained in an amount of 0.1 to 10 parts by weight, more preferably 1 to 7 parts by weight, still more preferably 1 to 5 parts by weight, with respect to the total weight of the composition containing the ASA graft copolymer and the matrix resin. Within the above range, the effect of the additive may be expressed without deteriorating the inherent physical properties of the resin.

In addition, the thermoplastic ASA resin composition of the present invention may be prepared as an ASA molded part through a heat molding process such as injection molding.

For example, the injection molding may be performed at 190 to 300° C. and 30 to 80 bar or at 200 to 250° C. and 30 to 70 bar. Within this range, processability may be excellent, and desired mechanical properties and appearance characteristics may be obtained.

The ASA molded part according to the present invention contains the ASA graft copolymer prepared by introducing the novel emulsifier, and thus the ASA molded part has excellent thermal stability. Specifically, the ASA molded part is allowed to stand at 260° C. for 10 minutes and then injected, and, when chromaticity of the ASA molded part is measured using a spectrocolorimeter, a chromaticity change value ($\Delta E$) between chromaticity values measured before and after standing at 260° C. is more than 0 and 4 or less, 0.1 or more and 3.5 or less, or 0.1 or more and 3.3 or less. Within the above range, surface properties such as glossiness and whiteness may be excellent.

According to the method of preparing an ASA molded part, when the ASA molded part is injected, the amount of generated gas may be 1,000 ppm or less, 300 to 1,000 ppm, 300 to 800 ppm, or 300 to 700 ppm, more preferably 600 ppm or less, or 300 to 600 ppm. Within the above range, the surface roughness of a resin may be excellent, whereby appearance such as glossiness and whiteness may be improved.

In the methods of preparing the thermoplastic ASA resin composition and the ASA molded part, other conditions not specified are not particularly limited so long as the conditions are within the range usually used in the technical field of the present invention, and the conditions may be appropriately selected and used as needed.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Example 1

1. Polymeric Seed Preparation Step 6 parts by weight of butyl acrylate, 1.5 parts by weight of sodium dodecyl sulfate, 0.04 parts by weight of ethylene glycol dimethacrylate, 0.02 parts by weight of allyl methacrylate, 0.1 parts by weight of potassium hydroxide, and 45 parts by weight of distilled water were added into a nitrogen-substituted reactor at once, and temperature was raised to 70° C., and 0.04 parts by weight of potassium persulfate was added into the reactor to initiate polymerization. The polymerization was then continued for 1 hour.

The average size of the obtained rubber polymer particles after completion of the reaction was 40 nm.

2. Polymeric Core Preparation Step 44 parts by weight of butyl acrylate, 0.5 parts by weight of sodium dodecyl sulfate, 0.2 parts by weight of ethylene glycol dimethacrylate, 0.2 parts by weight of allyl methacrylate, 30 parts by weight of distilled water, and 0.05 parts by weight of potassium persulfate were mixed with the polymeric seeds. Then, the mixture was continuously added into a reactor at 70° C. for 2.5 hours. After completion of the addition, polymerization was further performed for 1 hour.

The average size of the obtained rubber polymer particles after completion of the reaction was 80 nm.

3. Polymeric Graft Shell Preparation Step

In the presence of the polymeric cores, a monomer mixture including 23 parts by weight of distilled water, 38 parts by weight of styrene, and 12 parts by weight of acrylonitrile; an emulsion including 0.8 parts by weight of a mixed emulsifier FS200 (LG Household & Health Care) including 80% by weight of a monocyclic difunctional carboxylic acid having 36 carbon atoms, 15% by weight of a bicyclic difunctional carboxylic acid having 54 carbon atoms, and 5% by weight of an acyclic difunctional carboxylic acid having 18 carbon atoms or less, 0.1 parts by weight of tert-dodecyl mercaptan (TDDM), and 0.05 parts by weight of cumene hydroperoxide; and a mixed liquid including 0.09 parts by weight of sodium pyrophosphate, 0.12 parts by weight of dextrose, and 0.002 parts by weight of ferrous sulfide were continuously added at 75° C. for 3 hours, and at the same time, polymerization was performed. After addition of the emulsion and the mixed liquid was completed, the mixture was further reacted at 75° C. for 1 hour to increase a polymerization conversion rate, and then cooled to 60° C. to complete the polymerization and obtain a graft copolymer latex.

The polymerization conversion rate of the prepared graft copolymer latex was 99%, and the average size of the final particles was 100 nm.

4. Preparation of Graft Copolymer Powder

To prepare acrylate-styrene-acrylonitrile copolymer powder, 0.8 parts by weight of an aqueous solution of calcium chloride was added to the prepared acrylate-styrene-acrylonitrile graft copolymer latex. Then, coagulation was performed at 70° C. under atmospheric pressure, aging was performed at 93° C., dehydration and washing was performed, and drying was performed at 90° C. for 30 minutes using hot blast.

5. Preparation of Acrylic Thermoplastic Resin 44 parts by weight of the graft copolymer powder, 56 parts by weight of rigid matrix styrene-acrylonitrile copolymer 90HR (including 27% by weight of acrylonitrile and 73% by weight of styrene, manufactured by LG Chem.), 1.5 parts by weight of a lubricant, 1.0 parts by weight of an antioxidant, and 1.0 parts by weight of an ultraviolet light stabilizer was added and mixed. The mixture was prepared in the form of a pellet at a cylinder temperature of 220° C. using a 36 pie extrusion type kneader, and the pellet-shaped resin was subjected to injection molding (injection molding temperature of 200 to 230° C., injection molding pressure of 40 to 60 bar) to prepare a specimen for measuring physical properties.

Example 2

A graft copolymer latex was prepared in the same manner as in Example 1, except that an emulsion including 0.4 parts by weight of mixed emulsifier FS200 (LG Household & Health Care), 0.7 parts by weight of sodium rosinate, 0.1 parts by weight of TDDM, and 0.05 parts by weight of cumene hydroperoxide was used in pace of the emulsion in the polymeric graft shell preparation step of Example 1.

The polymerization conversion rate of the prepared graft copolymer latex was 98.5%, and the average size of the final particles was 105 nm.

Example 3

Polymeric seeds were prepared in the same manner as in Example 1, except that sodium dodecyl sulfate was used in an amount of 1.8 parts by weight instead of 1.5 parts by weight in the polymeric seed preparation step of Example 1, and an acrylic thermoplastic resin was prepared using the polymeric seeds in the same manner as in Example 1.

The average size of the prepared polymeric seeds was 38 nm, the average size of cores was 75 nm, and the final size was 90 nm.

Example 4

Polymeric seeds were prepared in the same manner as in Example 1, except that sodium dodecyl sulfate was used in an amount of 1.0 parts by weight instead of 1.5 parts by weight in the polymeric seed preparation step of Example 1, and an acrylic thermoplastic resin was prepared using the polymeric seeds in the same manner as in Example 1.

The average size of the prepared polymeric seeds was 55 nm, the average size of cores was 105 nm, and the final size was 135 nm.

Example 5

A graft copolymer latex was prepared in the same manner as in Example 1, except that an emulsion including 0.5 parts by weight of emulsifier AS200 (LG Household & Health Care) including 29% by weight of acyclic difunctional potassium carboxylate having 18 to 20 carbon atoms represented by Formula 8 below, 0.6 parts by weight of sodium rosinate, 0.1 parts by weight of TDDM, and 0.05 parts by weight of cumene hydroperoxide was used instead of the emulsion in the polymeric graft shell preparation step of Example 1.

The polymerization conversion rate of the prepared graft copolymer latex was 98.5%, and the average size of the final particles was 105 nm.

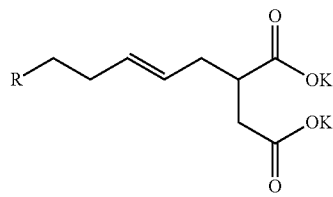

[Formula 8]

(in the Formula 8, R is an alkyl group having 9 to 11 carbon atoms)

Comparative Example 1

A graft copolymer latex was prepared in the same manner as in Example 1, except that an emulsion including 1.8 parts by weight of potassium rosinate, 0.1 parts by weight of TDDM, and 0.05 parts by weight of cumene hydroperoxide was used in pace of the emulsion in the polymeric graft shell preparation step of Example 1.

The polymerization conversion rate of the prepared graft copolymer latex was 98%, and the average size of the final particles was 110 nm.

Comparative Example 2

An experiment was performed in the same manner as in Example 1, except that sodium dodecyl sulfate was used in an amount of 0.8 parts by weight instead of 1.5 parts by weight in the polymeric seed preparation step of Example 1.

The average size of seeds was 70 nm, the average size of cores was 115 nm, and the final size was 155 nm.

Test Example

The physical properties of the ASA graft copolymers and the acrylic thermoplastic resins prepared according to Examples 1 to 5 and Comparative Examples 1 and 2 were measured in the following manner, and the results are shown in Table 1.

Polymerization Conversion Rate (%)

1.5 g of the prepared latex was dried in a hot blast dryer at 150° C. for 15 minutes, and weight was measured to determine total solid content (TSC). The polymerization conversion was calculated using Equation 1 below.

Polymerization conversion rate (%)=total solid content (TSC)×(weight of added monomer and supplementary material)/100−(weight of added supplementary material excluding monomer)   [Equation 1]

Average Size of Particles (nm)

1 g of a latex was mixed with 100 g of distilled water, and the average size of particles was measured in Gaussian mode using dynamic laser light scattering in Nicomp 380HPL (PSS•Nicomp Co., USA).

Content of Coagulated Material (%)

A latex was filtered using a 100 mesh wire filter, and the coagulated material filtered on the wire mesh was dried in a hot blast drier at 100° C. for 1 hour. The weight of the dried coagulated material was measured and expressed as a ratio (%) to the total amount of the used monomer and supplementary material Izod Impact Strength (kgf/cm^2)

The thickness of a specimen was set to ¼", and Izod impact strength was measured using a method of standard measurement ASTM 256.

Flow Index (MI: Melt Flow Index, g/10 min)

Flow index was measured at 220° C. under a load of 10 kg for 10 minutes using the ASTM D1238 method.

Tensile Strength (kg/cm^2)

The tensile strength of a specimen was measured using a method of standard measurement ASTM D638.

Surface Gloss

Surface gloss was measured at an angle of 45° to a specimen using a method of standard measurement ASTM D528.

Whiteness (Whiteness Index)

Whiteness was measured according to the method of CIE Lab.

TGA Analysis 0.1 g of graft copolymer powder was heated from 30° C. to 250° C. at a rate of 20° C./min under a nitrogen atmosphere, and weight loss was measured while keeping the powder at 250° C. for 1 hour. The measured weight loss was expressed by resin residue amount (%).

Evaluation of Dwelling Thermal Stability

The prepared pellet using an extrusion type kneader was allowed to stand in an injection molding machine at a molding temperature of 260° C. for 5 minutes. Then, to determine the degree of discoloration of the molded specimen, L, a, and b values were measured using a spectrocolorimeter, and the degree of discoloration (ΔE) was calculated using Equation 2 below. Here, ΔE is the arithmetic mean value of a value by CIE Lab before and after performing an experiment of dwelling thermal stability. ΔE lose to 0 indicates that thermal stability is good.

$$\Delta E = \sqrt{(L'-L)^2 + (a'-a)^2 + (b'-b)^2}$$ [Equation 2]

Evaluation of Appearance Characteristics

An acrylic thermoplastic resin was extruded into a film having a thickness of 0.01 mm at 220° C., and then the appearance characteristics were evaluated based on the number of unmelted projections (size of 50 to 500 μm). Low values indicate good appearance properties when processing thin films.

Measurement of Gas Generation Amount (ppm)

The total amount of volatile organic compounds generated in 1 g of ASA copolymer powder at 250° C. for 1 hour was measured using HS-GC/MSD.

TABLE 1

|  | Example 1 | Example 2 | Example 3 | Example 4 | Example 5 | Comparative Example 1 | Comparative Example 2 |
|---|---|---|---|---|---|---|---|
| Polymerization conversion rate (%) | 99 | 98.5 | 99.5 | 98 | 98.5 | 98 | 97 |
| Final particle size (nm) | 100 | 105 | 90 | 135 | 105 | 110 | 155 |
| Content of coagulated material (%) | 0.01 | 0.02 | 0.02 | 0.02 | 0.2 | 0.1 | 0.03 |
| Impact strength (kgf/cm$^2$) | 7.5 | 8.0 | 7.0 | 8.2 | 7.7 | 7.6 | 8.5 |
| Liquidity (g/10 min) | 15.3 | 15.5 | 14.5 | 14.3 | 15.2 | 15.0 | 12.0 |
| Tensile strength (kg/cm$^2$) | 505 | 507 | 508 | 500 | 498 | 515 | 500 |
| Surface gloss | 101.2 | 101.3 | 102.5 | 100.8 | 101.1 | 100.2 | 99.0 |
| whiteness | 63.5 | 63.0 | 63.4 | 63.4 | 63.4 | 60.0 | 63.0 |
| TGA (%) | 99.4 | 99.5 | 99.2 | 99.5 | 99.3 | 98.0 | 99.0 |
| ΔE | 3.4 | 3.3 | 3.5 | 3.2 | 3.3 | 5.3 | 4.2 |
| Number of projections | 350 | 400 | 300 | 500 | 420 | 900 | 1500 |
| Gas generation amount (ppm) | 550 | 570 | 565 | 580 | 600 | 1100 | 1050 |

As shown in Table 1, the ASA molded parts containing the ASA graft copolymers of Examples 1 to 5 exhibited physical properties, including impact strength, tensile strength, and liquidity, similar to those of Comparative Examples 1 and 2. In the case of surface gloss, dwelling thermal stability, surface roughness, and gas generation amount, the ASA molded parts of Examples 1 to 5 were superior to those of Comparative Examples 1 and 2.

These results may be explained for the following reasons. In Examples 1 to 5, a salt of a multifunctional carboxylic acid having 20 or more carbon atoms is used as an emulsifier in the shell preparation step. Therefore, a small amount of the emulsifier may be used in contrast to conventional emulsifiers. Further, since the thermal stability of the emulsifier is improved, the amount of gas generated when performing injection molding is reduced, so that surface gloss, dwelling thermal stability, and roughness may be improved.

In addition, referring to Table 1, the ASA graft copolymer latexes of Examples 1 to 5 prepared by introducing a novel emulsifier have a desired average size and a small amount of coagulated material. These results show that the emulsifier of the present invention may also contribute to secure the stability of polymerization and a latex.

In addition, in the case of the molded part of Comparative Example 2, the novel emulsifier according to the present invention was introduced in the shell preparation step, but in the seed preparation step, an emulsifier was used in an amount two times that of Example 1. Thus, compared to Examples 1 to 5, a polymer having a large diameter was prepared, and on the surface of the molded part, the number of unmelted projections was the greatest. Based on these results, it can be confirmed that the appearance characteristics of the ASA molded part are significantly influenced by the type of an emulsifier and the particle size of a polymer.

The invention claimed is:

1. A method of preparing an ASA graft copolymer, comprising:
   a) a seed preparation step, in which one or more monomers selected from an aromatic vinyl monomer, a vinyl cyan monomer, and an alkyl acrylate monomer are polymerized to prepare seeds;
   b) a core preparation step, in which an alkyl acrylate monomer is added in the presence of the prepared seeds, and polymerization is performed to prepare cores; and
   c) a shell preparation step, in which one or more monomers selected from an aromatic vinyl monomer and a vinyl cyan monomer and an emulsifier are added in the presence of the prepared cores, and graft polymerization is performed to prepare shells,
   wherein the emulsifier contains a multifunctional carboxylic acid having 20 to 60 carbon atoms or a salt thereof, and an average size of the prepared shells is 80 to 150 nm (larger than an average size of the cores).

2. The method according to claim 1, wherein two or three carboxyl groups are comprised in a structure of the multifunctional carboxylic acid.

3. The method according to claim 1, wherein the multifunctional carboxylic acid having 20 to 60 carbon atoms or the salt thereof is contained in an amount of 30 to 100% by weight with respect to a total weight of the emulsifier.

4. The method according to claim 1, wherein the emulsifier contains the multifunctional carboxylic acid having 20 to 60 carbon atoms or the salt thereof and a carboxylate having 10 to 20 carbon atoms.

5. The method according to claim 4, wherein the emulsifier contains the multifunctional carboxylic acid having 20 to 60 carbon atoms or the salt thereof and the carboxylate having 10 to 20 carbon atoms in a weight ratio of 1:0.1 to 1:10.

6. The method according to claim 1, wherein, in the seed preparation step, with respect to 100 parts by weight of total monomers used to prepare the copolymer, 4 to 20 parts by weight of one or more monomers selected from an aromatic vinyl monomer, a vinyl cyan monomer, and an alkyl acrylate are polymerized to prepare seeds.

7. The method according to claim 6, wherein an average size of the seeds is 30 to 80 nm.

8. The method according to claim 1, wherein, in the core preparation step, 30 to 60 parts by weight of an acrylate monomer and 0.01 to 1 part by weight of a crosslinking agent are added in the presence of the seeds, and polymerization is performed to prepare cores.

9. The method according to claim 8, wherein the crosslinking agent comprises an acrylic crosslinking agent.

10. The method according to claim 8, wherein an average size of the cores is 70 to 110 nm (larger than an average size of the seeds).

11. The method according to claim 1, wherein, in the shell preparation step, 30 to 60 parts by weight of an aromatic vinyl monomer or a vinyl cyan monomer and 0.1 to 3 parts by weight of an emulsifier are added in the presence of the cores, and graft polymerization is performed to prepare shells.

12. A method of preparing a thermoplastic ASA resin composition, comprising a step of mixing and extruding 20 to 60% by weight of the ASA graft copolymer according to the method of claim 1 and 40 to 80% by weight of a vinyl cyan monomer-aromatic vinyl monomer copolymer.

13. The method according to claim 12, wherein, when the mixing is performed, one or more additives selected from the group consisting of a flame retardant, a lubricant, an antibacterial agent, a release agent, a nucleating agent, a plasticizer, a heat stabilizer, an antioxidant, a light stabilizer, a pigment, a dye, and a compatibilizer are further mixed.

14. A method of preparing an ASA molded part, comprising a step of injecting the thermoplastic ASA resin composition prepared according to claim 12.

15. The method according to claim 14, wherein the ASA molded part is allowed to stand at 260° C. for 10 minutes and then injected, and, when chromaticity of the ASA molded part is measured using a spectrocolorimeter, a chromaticity change value (ΔE) between chromaticity values measured before and after standing at 260° C. is more than 0 and 4 or less.

16. The method according to claim 14, wherein, in the step of injecting, an amount of generated gas is 1,000 ppm or less.

* * * * *